(12) United States Patent
Hiramatsu

(10) Patent No.: US 7,661,712 B2
(45) Date of Patent: Feb. 16, 2010

(54) SEAT BELT RETRACTOR

(75) Inventor: Koji Hiramatsu, Minato-ku (JP)

(73) Assignee: Takata Corporation, Tokyo (JP)

( * ) Notice: Subject to any disclaimer, the term of this patent is extended or adjusted under 35 U.S.C. 154(b) by 132 days.

(21) Appl. No.: 12/078,149

(22) Filed: Mar. 27, 2008

(65) Prior Publication Data
US 2008/0246268 A1    Oct. 9, 2008

(30) Foreign Application Priority Data
Mar. 28, 2007    (JP) ............................. 2007-083784

(51) Int. Cl.
*B60R 22/36*    (2006.01)
(52) U.S. Cl. ...................... 280/806; 242/374; 242/382; 242/382.2
(58) Field of Classification Search ................. 280/803, 280/806, 807; 242/374, 376, 382, 382.2, 242/382.5, 385
See application file for complete search history.

(56) References Cited
U.S. PATENT DOCUMENTS 6,416,008 B1    7/2002    Fujii et al.
6,676,058 B2 *  1/2004    Nagata et al. ............. 242/379.1
7,240,924 B2 *  7/2007    Kohlndorfer et al. ........ 280/807
7,278,600 B2 * 10/2007    Inuzuka et al. .............. 242/374
7,384,014 B2 *  6/2008    Ver Hoven et al. ....... 242/382.2
7,416,151 B2 *  8/2008    Mori et al. ................ 242/390.8
7,431,119 B2 * 10/2008    Tanaka ....................... 180/268
7,506,833 B2 *  3/2009    Tanaka ....................... 242/374
7,571,873 B2 *  8/2009    Takamatsu ............... 242/382.2

FOREIGN PATENT DOCUMENTS

JP    10-35411    2/2002

* cited by examiner

*Primary Examiner*—Toan C To
(74) *Attorney, Agent, or Firm*—Foley & Lardner LLP

(57) ABSTRACT

A seat belt retractor including a spool for winding up a seat belt, a locking mechanism having a locking member that is prevented from rotating in a belt withdrawing direction in the event of an emergency, and a seat belt load limiting mechanism for limiting load applied to the seat belt when the spool rotates relative to the locking member. The load limiting mechanism comprises a torsion bar that rotationally connects the spool and the locking member and is torsionally deformable when the spool rotates relative to the locking member, and a shearing member that is disposed to extend both in the spool and the locking member, the shearing member being shear-deformable when the spool rotates relative to the locking member. At least a portion of the area of the shearing member positioned in the spool is fixed to the spool in the axial direction.

7 Claims, 5 Drawing Sheets

FIG. 5(a)
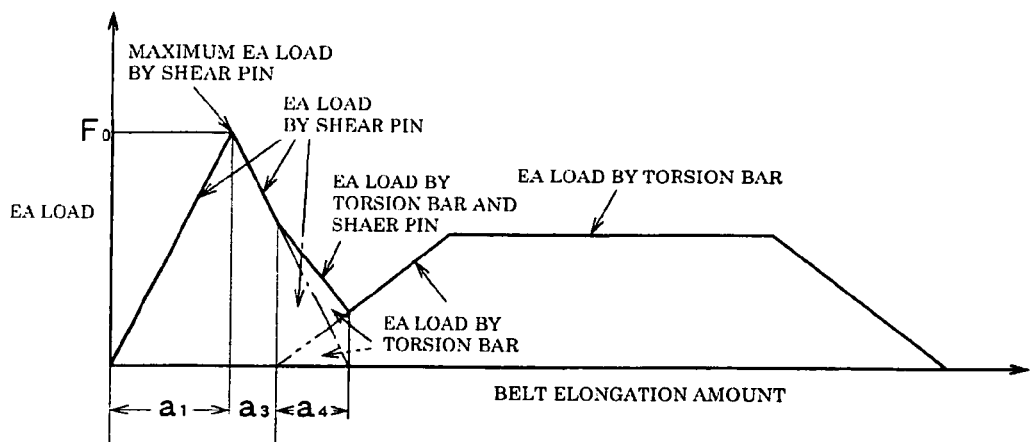
PRESENT INVENTION
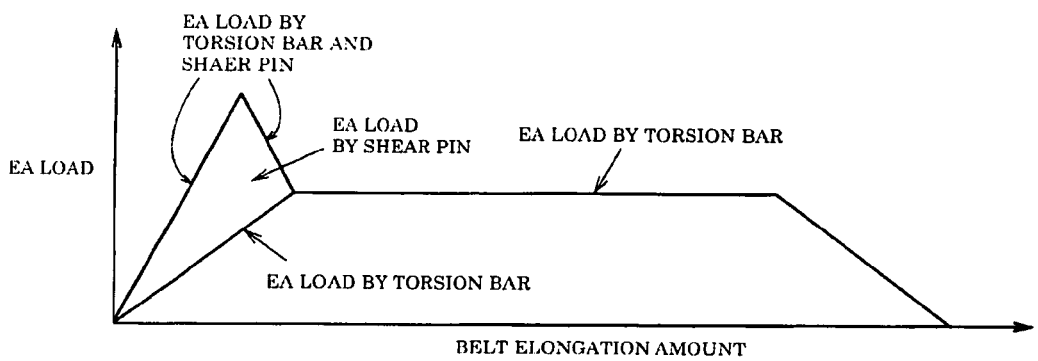
PRIOR ART
FIG. 5(b)

SEAT BELT RETRACTOR

BACKGROUND

The present application relates to a technical field of a seat belt retractor, for retracting a seat belt such that the seat belt can be freely withdrawn and wound, in a seat belt apparatus installed in a vehicle.

More particularly, the present application relates to a seat belt retractor that comprises a seat belt load limiting mechanism for absorbing an occupant's kinetic energy to limit load on a seat belt at the time of preventing seat belt withdrawal in the event of an emergency such as a collision in which a large deceleration acts on a vehicle when the occupant wears the seat belt, and a seat belt.

Conventionally, a seat belt apparatus installed in a vehicle such as an automobile restrains an occupant with a seat belt in the event of an emergency as mentioned above. Such a seat belt apparatus is provided with a seat belt retractor for winding up the seat belt. In the seat belt retractor, the seat belt is wound onto a spool when the seat belt apparatus is not used and is withdrawn from the spool to be worn by the occupant when the seat belt apparatus is used. The seat belt retractor has a locking mechanism which is activated in the event of an emergency as mentioned above to prevent the spool from rotating in the seat belt withdrawing direction, thereby preventing the withdrawal of the seat belt. Therefore, the seat belt securely restrains the occupant in the event of an emergency.

In the seat belt retractor of the conventional seat belt apparatus, the occupant is forced to move forward by a large inertia force because of large deceleration acting on the vehicle when the seat belt restrains the occupant in the event of an emergency such as a vehicle collision. Accordingly, a large load is applied to the seat belt by kinetic energy of the occupant and the occupant thus receives a large force from the seat belt. It is preferable to reduce the force applied to the occupant.

For reducing the force, a variety of seat belt retractors with seat belt load limiting mechanism have been developed. The seat belt load limiting mechanism may include a torsion bar and a shear pin as a shearing member which are disposed between a spool for winding up a seat belt and a locking plate for locking the rotation of the spool in the belt withdrawing direction.

One seat belt load limiting mechanism includes an energy absorbing mechanism (hereinafter, sometimes referred to as "EA mechanism") that absorbs kinetic energy of the occupant by torsional deformation of the torsion bar and the shear deformation of the shear pin when a relative rotation is generated between the spool and the locking plate (e.g., in the event of an emergency when the seat belt is worn). The kinetic energy of the occupant is absorbed by the EA mechanism, thereby limiting the load on the seat belt. The load reduced by energy absorption of the EA mechanism is an EA load and is a limited load indicating the limited amount of load acting on the seat belt. The shear pin is fitted in an axial hole of the spool. Accordingly, as the shearing load acts on the shear pin during the relative rotation between the spool and the locking plate, the shear pin moves in a direction coming off the spool. However, a portion of the locking plate where the shear pin is fitted moves apart from the spool to create a space between the locking plate and the spool so that a bending load also acts on the shear pin in addition to the shearing load.

It would be advantageous to provide a seat belt retractor with a load limiting mechanism that limits a bending load acting on a shearing member and to provide a seat belt apparatus employing the seat belt retractor.

SUMMARY

One disclosed embodiment relates to a seat belt retractor comprising a spool for winding up a seat belt, a locking mechanism having a locking member that is prevented from rotating in a belt withdrawing direction in the event of an emergency, and a seat belt load limiting mechanism for limiting load applied to the seat belt when the spool rotates relative to the locking member. The load limiting mechanism comprises a torsion bar that rotationally connects the spool and the locking member and is torsionally deformable when the spool rotates relative to the locking member, and a shearing member that is disposed to extend both in the spool and the locking member, the shearing member being shear-deformable when the spool rotates relative to the locking member. At least a portion of the area of the shearing member positioned in the spool is fixed to the spool in the axial direction.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 5(a) is a graph showing EA load in the seat belt retractor according to the present invention.

FIG. 5(b) is a graph showing EA load in a conventional seat belt retractor.

DETAILED DESCRIPTION

Figure 1:
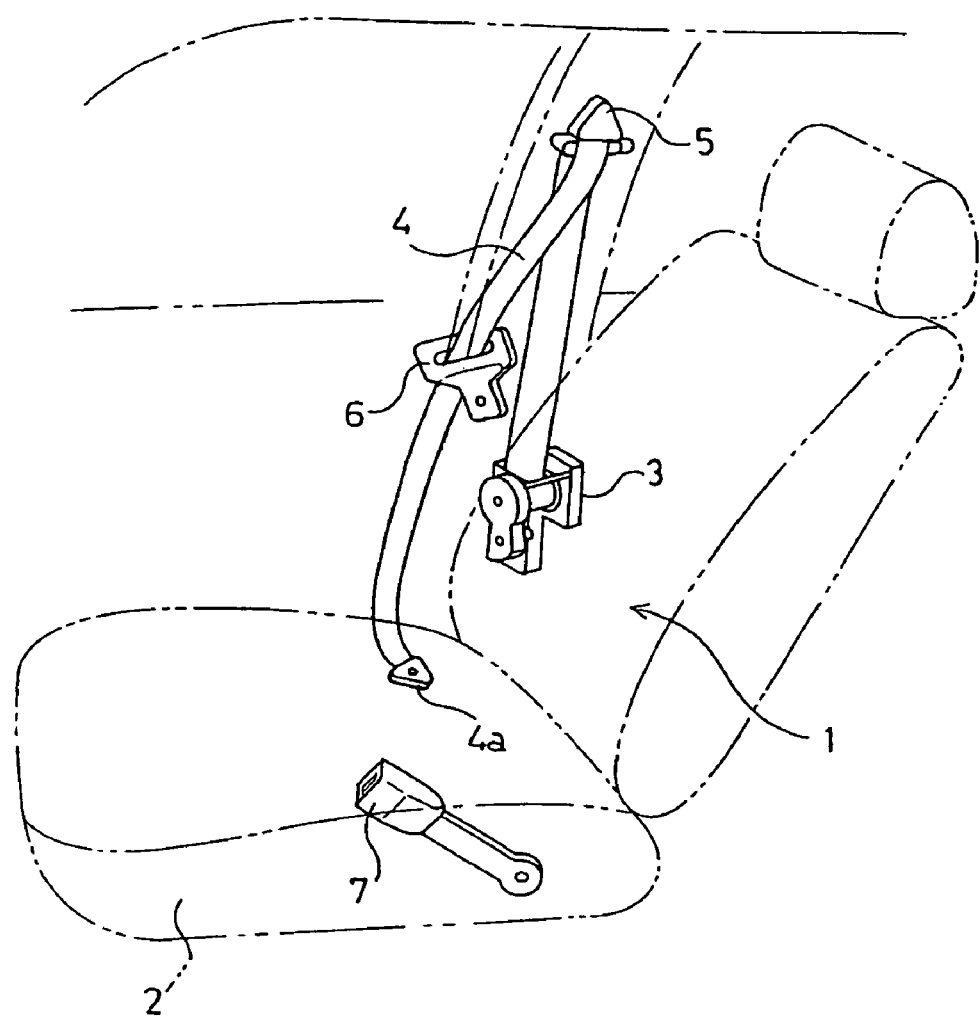
FIG. 1 is a schematic illustration of a seat belt apparatus comprising a seat belt retractor as an embodiment according to the present invention.

One disclosed embodiment relates to a seat belt retractor comprising a spool for winding up a seat belt, a locking mechanism having a locking member that is prevented from rotating in a belt withdrawing direction in the event of an emergency, and a seat belt load limiting mechanism for limiting load applied to the seat belt when the spool rotates relative to the locking member. The load limiting mechanism comprises a torsion bar that rotationally connects the spool and the locking member and is torsionally deformable when the spool rotates relative to the locking member, and a shearing member that is disposed to extend both in the spool and the locking member, the shearing member being shear-deformable when the spool rotates relative to the locking member. At least a portion of the area of the shearing member positioned in the spool is fixed to the spool in the axial direction. The shearing member is a shear pin, and a portion of the shear pin is screwed into the spool so that the shear pin can not move relative to the spool. The shear pin has a notch groove formed therein that is adapted to be sheared.

The shearing member is disposed to extend both in the spool and the locking member. A portion of the area of the shearing member positioned in the spool is fixed to the spool so it may not move relative to the spool in the axial direction. Therefore, even when a force acts on the shearing member to pull the shearing member away from the spool (e.g., when a relative rotation is generated between the spool and the locking member) the shearing member is prevented from moving in a direction of coming off the spool. This prevents the portion of the locking member coupled to the shearing member, from separating from the spool. Accordingly, no bending load acts on the shearing member and the shearing member experiences only a shearing load. Therefore, the load limiting action of the shearing member is conducted substantially only by shear deformation.

The shearing member is a shear pin with a relatively simple, inexpensive structure. Because the portion of the shear pin is simply screwed into the spool, the seat belt load limiting mechanism can be easily and inexpensively manufactured with slight design change without significant design change of a seat belt load limiting mechanism of a conventional seat belt retractor.

By connecting the shear pin to the spool by screwing, the position of the shear pin relative to the spool may be maintained consistently during manufacturing, improving accuracy of positions of the notch groove, formed in the shear pin, relative to the spool when the shear pin is assembled to the spool. Accordingly, it is possible to set the shearing load of the shear pin with high accuracy to further secure the load limiting action of the shearing member by the shear deformation.

Since the disclosed seat belt apparatus employs the seat belt retractor described above, the load limiting action of the shearing member can be conducted substantially only with the shear deformation, thereby achieving the restraint of an occupant by the seat belt in the event of an emergency with smaller restraining force.

FIG. 1 is an illustration schematically showing a seat belt apparatus comprising a seat belt retractor according to one exemplary embodiment. As shown in FIG. 1, the seat belt apparatus 1 of this embodiment is similar to a conventionally known seat belt apparatus of a three-point type. The seat belt apparatus 1 includes a seat belt retractor 3 that is fixed to a vehicle body near a vehicle seat 2, a seat belt 4 that is withdrawn from the seat belt retractor 3 and is provided at its end with a belt anchor 4a fixed to a vehicle floor or the vehicle seat 2, a deflection fitting 5 for guiding the seat belt 4 withdrawn from the seat belt retractor 3 toward an occupant's shoulder, a tongue 6 that is slidably supported by the seat belt 4 guided by and extending from the deflection fitting 5, and a buckle 7 that is fixed to the vehicle floor or the vehicle seat 2 and to which the tongue 6 can be inserted and detachably latched.

Figure 2:
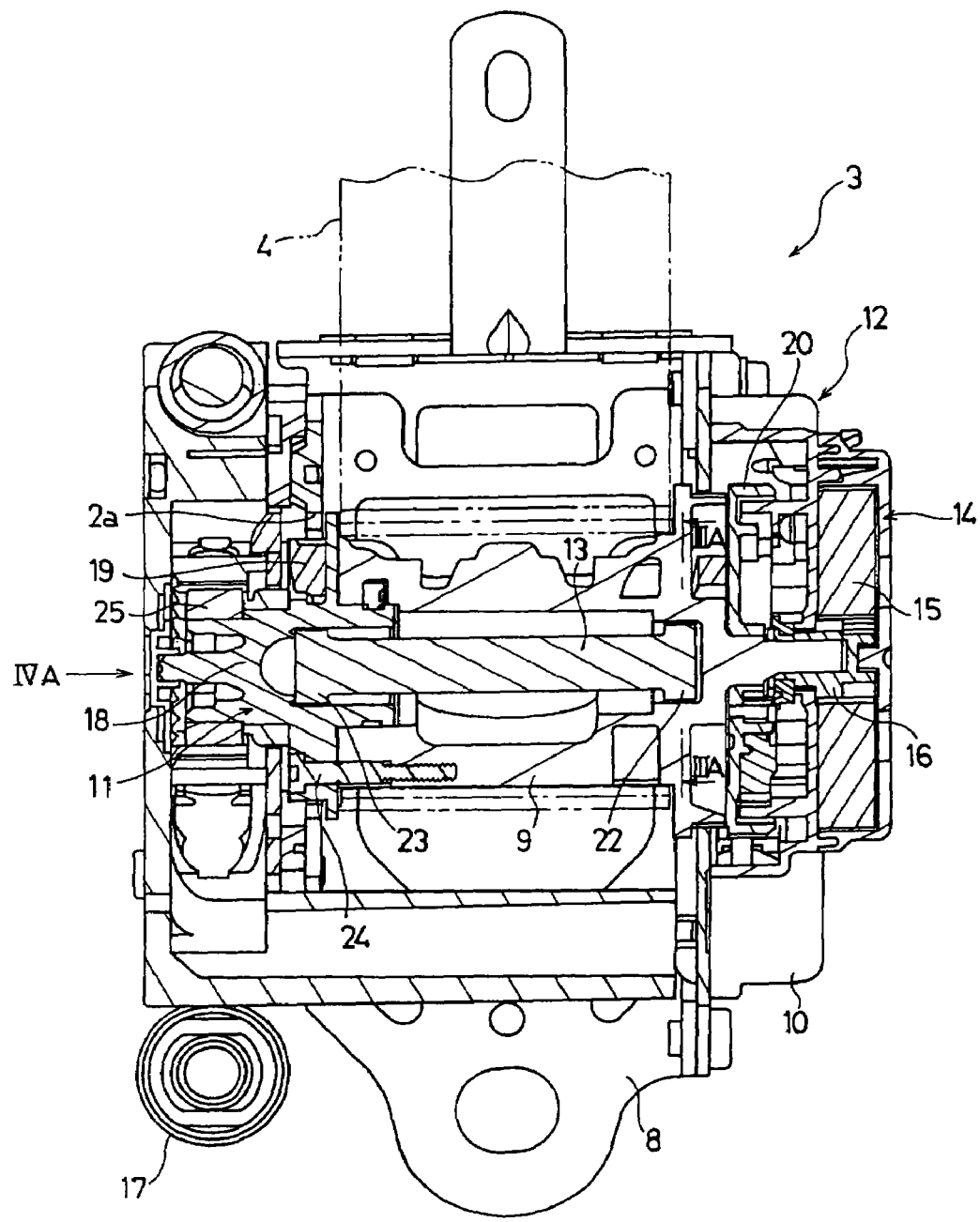
FIG. 2 is a vertical sectional view showing the seat belt retractor of the embodiment shown in FIG. 1.

FIG. 2 is a vertical sectional view showing the seat belt retractor of this embodiment. Among components of the seat belt retractor 3 of this embodiment, basic components the same as those of a conventional seat belt retractor will be described briefly. The seat belt retractor 3, includes a U-shaped frame 8, a spool 9 that is rotatably supported between the side walls of the U-shaped frame 8 and on which the seat belt 4 is wound. The seat belt retractor further includes a deceleration sensing mechanism 10 that senses a large vehicle deceleration generated in the event of an emergency as mentioned above and is thus actuated. A lock actuation control mechanism 12 is actuated by the deceleration sensing mechanism 10 to control the operation of a locking mechanism 11. The locking mechanism 11 prevents the spool 9 from rotating in the belt withdrawing direction during operation. A torsion bar 13 is fitted in the center of the spool 9 with some looseness to extend in the axial direction and rotationally connects the spool 9 and the locking mechanism 11. A spring mechanism 14 biases the spool 9 in the belt winding direction via a bush 16 by spring force of a spiral spring 15. A pretensioner 17 is actuated in the event of an emergency as described above to generate belt winding torque.

As shown in FIG. 2, the locking mechanism 11 is disposed on a side (the left side in FIG. 2) of the spool 9 opposite the lock actuation control mechanism 12. In the conventionally known typical seat belt retractor, the locking mechanism 11 is often disposed on the same side of the spool as the lock actuation control mechanism 12. The locking mechanism 11 comprises a locking base or locking member 18 which is disposed rotatably relative to the spool 9 and a pawl 19 pivotally supported by the locking base 18.

The lock actuation control mechanism 12 comprises a lock gear 20 that is supported by the spool 9. The lock gear 20 normally rotates together with the spool 9, but is stopped by the operation of the deceleration sensing mechanism 10 to generate a rotational difference relative to the spool 9 in the event of an emergency.

Figure 4C:
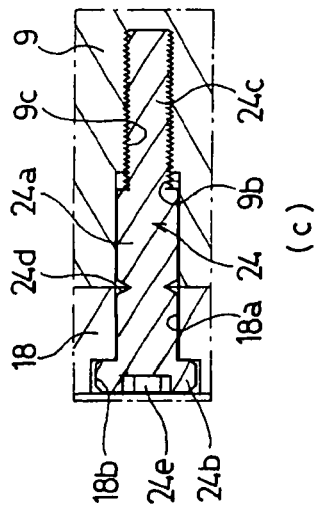
FIG. 4(c) is an enlarged view of a portion IVC in FIG. 4(b).
Figure 4B:
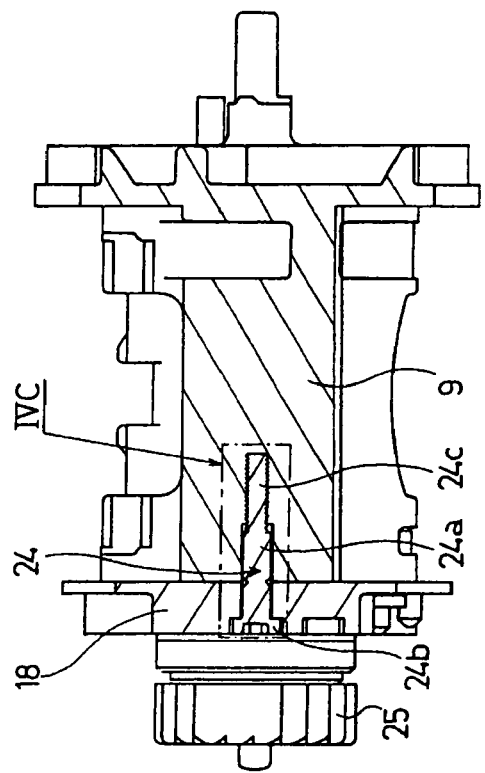
FIG. 4(b) is a sectional view taken along IVB-IVB in FIG. 4(a).
Figure 4A:
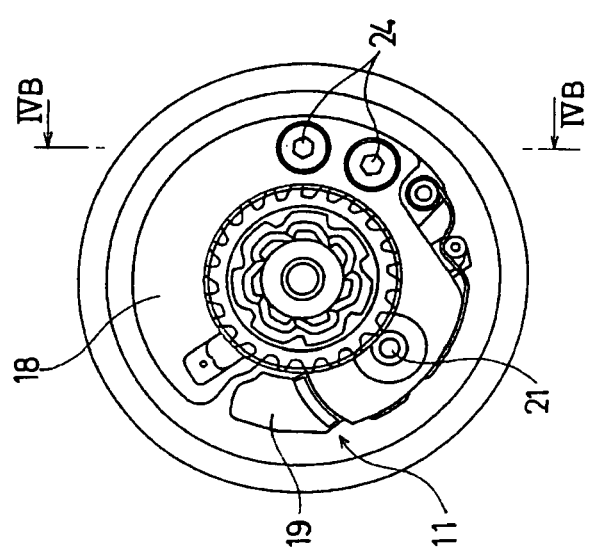
FIG. 4(a) is an illustration showing the installation state of shear pins as seen from IVA in FIG. 2 and with a pretensioner being omitted for clarity.

By the rotational difference of the lock gear 20 of the lock actuation control mechanism 12 relative to the spool 9 in the event of an emergency, a pawl 19 of the locking mechanism 11 is actuated via a control transmitting member 21 (shown in FIG. 4(a)) penetrating the spool 9 in the axial direction. Accordingly, the pawl 19 is engaged with one of internal teeth 2a of the frame 8 so as to lock the rotation of the spool 9 in the belt withdrawing direction β.

The torsion bar 13 is torsionally deformed by the relative rotation of the spool 9 with respect to the locking base 18 to absorb the energy applied on the seat belt 4 by the inertial movement of the occupant. Because of the EA load of the EA mechanism by the torsional deformation of the torsion bar 13, the load applied to the occupant by the seat belt 4 is reduced.

The torsion bar 13 has a first torque transmitting portion 22 that is formed at the spool 9 side end (the right side in FIG. 2) thereof and a second torque transmitting portion 23 which is formed at the locking base 18 side end (the left side in FIG. 2) thereof.

Figure 3B:
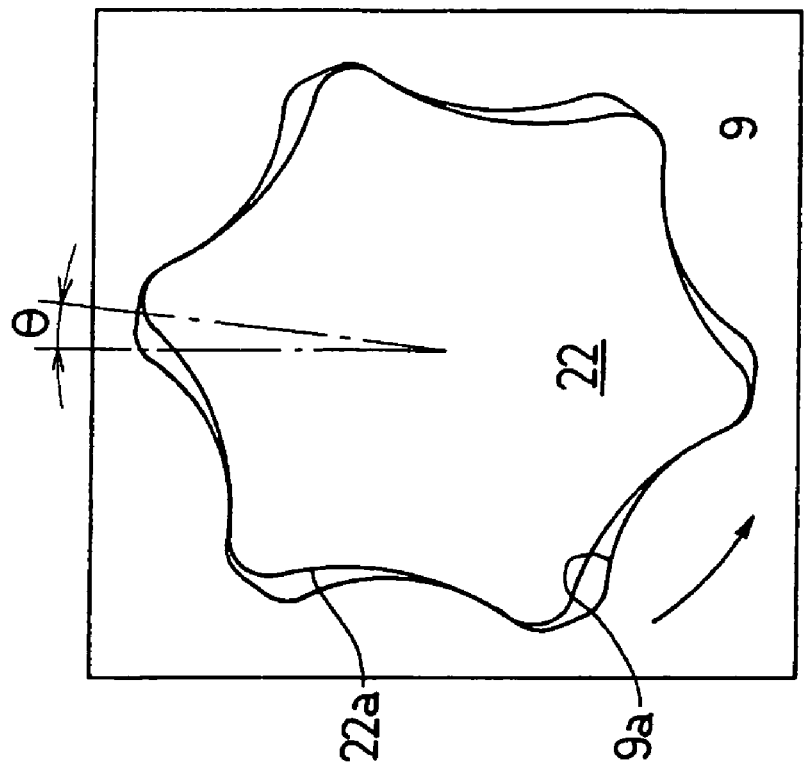
FIGS. 3(a) and 3(b) are sectional views taken along a line IIIA-IIIA in FIG. 2 showing the relation between a spool and a torsion bar in the normal state and during an emergency, respectively.
Figure 3A:
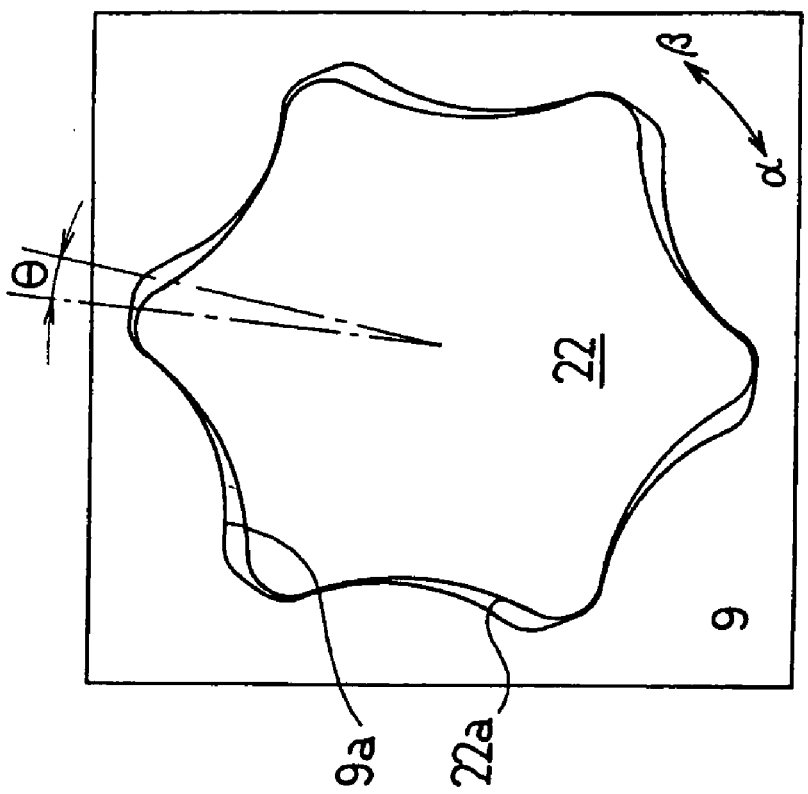

As shown in FIG. 3(a), the first torque transmitting portion 22 of the torsion bar 13 is fitted in a concavity 9a formed in the spool 9. In this case, the concavity 9a is formed in a regular hexagonal shape in its cross section. All corners of the hexagonal shape of the concavity 9a are rounded and all sides between the corners are curved to dent inward. The first torque transmitting portion 22 is formed in a regular hexagonal shape in its cross section which is slightly smaller than the hexagonal shape of the concavity 9a. All corners of the hexagonal shape of the first torque transmitting portion 22 are also rounded to be round corners and all sides between the corners are also curved to dent inward.

Therefore, as shown in FIGS. 3(a) and 3(b), the spool 9 and the torsion bar 13 can rotate relative to each other only by an angle θ when the first torque transmitting portion 22 is fitted in the concavity 9a. Normally, as shown in FIG. 3(a), the inner surface of the concavity 9a is in contact with the outer surface 22a of the first torque transmitting portion 22 in the belt winding direction a so that the spool 9 and the first torque transmitting portion 22 of the torsion bar 13 are maintained in a state where they are connected rotationally in the belt winding direction α.

As the locking mechanism 11 is actuated in the event of an emergency, the spool 9 rotates relative to the torsion bar 13 by an angle θ causing the inner surface of the concavity 9a to come in contact with the outer surface 22a of the first torque transmitting portion 22 of the belt withdrawing direction β. With the inner surface of the concavity 9a contacting the outer surface 22a, the spool 9 and the first torque transmitting portion 22 of the torsion bar 13 are connected rotationally in the belt withdrawing direction β as shown in FIG. 3(b). After that, the spool 9 and the torsion bar 13 rotate together in the belt withdrawing direction β. In this manner, during the operation of the locking mechanism 11, the spool 9 idly rotates relative to the torsion bar 13 in the belt withdrawing direction β by the angle θ. The setting of the idle angle θ of the spool 9 relative to the torsion bar 13 is described in detail below.

The second torque transmitting portion 23 of the torsion bar 13 is fitted in a concavity 18a that is formed in the locking base 18 to have a regular hexagonal shape in its cross section. The second torque transmitting portion 23 is also formed in a regular hexagonal shape in its cross section. The hexagonal shapes of the concavity 18a and the second torque transmitting portion 23 are substantially the same in size. Therefore, when the second torque transmitting portion 23 is fitted in the concavity 18a, the locking base 18 and the torsion bar 13 rotate together.

In addition to the EA mechanism formed by the torsion bar 13, the seat belt retractor 3 of this embodiment further includes a second EA mechanism such as a shearing member, shown as shear pins 24. As shown in FIG. 2 and FIG. 4(a), the second EA mechanism has two shear pins 24 inserted into the spool 9 and the locking base 18. These shear pins 24 are spaced from each other by predetermined distance in the circumferential direction and are positioned on a circle with an axis that is the same as the rotational axis of the spool 9. The shear pins 24 are the same ones and extend in the same direction as the axial direction of the spool 9. Though the two shear pins 24 are provided in the illustrative example, a predetermined number of, more than one, shear pins may be provided. In case that a plurality of shear pins are provided, it is preferable that the shear pins are disposed on a same circle and equally spaced.

As shown in FIGS. 4(b) and 4(c), each shear pin 24 comprises a shaft portion 24a, a head portion 24b formed at an end portion (the left side in FIGS. 4(b) and 4(c)) of the shaft portion 24a, and an external threaded portion 24c formed at the other end portion (the right side in FIGS. 4(b) and 4(c)). In this case, the head portion 24b is formed to have a diameter larger than that of the shaft portion 24a and the external threaded portion 24c is formed to have an outer diameter which is smaller than the outer diameter of the shaft portion 24a.

Formed in the outer periphery of the shaft portion 24a of the shear pin 24 is an annular notch groove 24d having a V-like shape in its section. The shear pin 24 is sheared at the notch groove 24d. Further, the head portion 24b has a slot 24e formed therein to which a tool such as a screwdriver (not shown) is fitted to turn the shear pin 24.

The spool 9 and the locking base 18 are provided with axial holes 9b, 18a formed therein, respectively, into which the shaft portion 24a of the shear pin 24 is substantially tightly fitted. The axial holes 9b, 18a are aligned to extend in the axial direction. The spool 9 has an internal threaded portion 9c formed to extend rightward from the axial hole 9b, into which the external threaded portion 24c of the shear pin 24 is screwed.

The locking base 18 is arranged relative to the spool 9 such that the axial holes 9b, 18a are aligned in a line. The shear pin 24 is inserted from the side the locking base 18 into the axial holes 9b, 18a in the axial direction. Further, the tool is fitted in the slot 24e and the shear pin 24 is turned by the tool, whereby the external threaded portion 24c is screwed into and fixed to the internal threaded portion 9c. Therefore, the shear pin 24 is securely attached between the spool 9 and the locking base 18.

With the shear pin 24 is attached to the spool 9 and the locking base 18, the locking base 18 is in press contact with the spool 9 in the axial direction substantially tightly and the axial position of the notch groove 24d of the shear pin 24 is substantially coincide with the position of the contact portion (boundary) between the spool 9 and the locking base 18 as shown in FIG. 4(c).

As mentioned above, in the seat belt retractor 3 of this embodiment, the EA mechanism is provided by both the torsion bar 13 and the shear pins 24. The shear pin 24 is sheared at the notch groove 24d when a shearing load more than a predetermined shearing load is applied. Since the EA load is set by adding the EA load by this shear fracture to the EA load by torsional deformation of the torsion bar 13, the EA load of the EA mechanism can be increased.

When a relative rotation is generated between the spool 9 and the locking base 18 by the operation of the locking mechanism 11 in the event of an emergency, both the EA actions of both the shear pins 24 and the torsion bar 13 are performed. The EA action by the shear fracture of the shear pins 24 is first performed and, during this EA action, the EA action of the torsion bar 13 is started. For this, the spool 9 is adapted to idly rotate relative to the torsion bar 13 in the belt withdrawing direction β, at an initial stage of the relative rotation between the spool 9 and the locking base 18. That is, the aforementioned idle angle θ of the spool 9 relative to the torsion bar 13 is set.

The idle angle θ is set by calibrating the system by the elongation of the belt 4. As shown in FIG. 5(a), the EA action by the shear pins 24 is started by elongation (withdrawal) of the seat belt 4 after the rotation of the locking base 18 is stopped by the operation of the locking mechanism 11. The belt elongation amount when the EA load by the shear pins 24 becomes the maximum EA load F0 is set to a belt elongation amount a1. The EA action by the torsion bar 13 is started when the belt elongation amount becomes a belt elongation amount a2 exceeding the belt elongation amount a1. The belt elongation amount a2 is an amount obtained by adding a belt elongation amount a3 to the belt elongation amount a1 for the maximum EA load F0 and is smaller by a predetermined belt elongation amount a4 than a belt elongation amount when the EA action by the shear pins 24 is terminated because the shear pins 24 are sheared. That is, the idle angle θ of the spool 9 relative to the torsion bar 13 is set to be an angle corresponding to the belt elongation amount a2 at the start of the EA action by the torsion bar 13.

Hereinafter, the respective actions of the seat belt retractor 3 having the aforementioned structure and the seat belt apparatus 1 having the same will be described.

The respective actions of the seat belt retractor 3 and the seat belt apparatus 1 for normal wearing of the seat belt 4 and normal removing of the seat belt 4 are the same as those of conventionally known typical seat belt retractor and seat belt apparatus. That is, when the seat belt 4 is not used, the seat belt 4 is fully wound up because of the biasing force of the spring mechanism 14. By withdrawing the seat belt 4 at a normal speed for wearing, the spool 9 rotates in the seat belt withdrawing direction so that the seat belt 4 is smoothly withdrawn. After the tongue 6 is inserted into and latched with the buckle 7, an excessively withdrawn part of the seat belt 4 is wound onto the spool 9 by the biasing force of the spring mechanism 14 so that the seat belt 4 is fitted to the occupant to the extent that the occupant does not feel stress. The seat belt 4 is removed by disengaging the latch between the tongue 6 and the buckle 7. The withdrawn seat belt 4 is fully wound onto the spool 9 by the biasing force of the spring mechanism 14.

In normal usage (e.g., the normal wearing action and the normal removing action) of the seat belt 4, the locking base 18 of the locking mechanism 11, the lock gear 20 of the lock actuation control mechanism 12, and the torsion bar 13 all rotate together with the spool 9. Therefore, the torsion bar 13 is not deformed. As shown in FIG. 3(a), the spool 9 is in contact with the first torque transmitting portion 22 of the torsion bar 13 in the belt winding direction α is maintained and no shearing load acts on the shear pins 24.

In the event of an emergency when the seat belt is worn, the pretensioner 17 is actuated to generate a seat belt winding torque. The seat belt winding torque is transmitted to the spool 9 via the pinion 25 and the locking base 18 so that the spool 9 winds up a predetermined amount of the seat belt 4 to restrain the occupant. With nothing to stop it, inertial forward movement of the occupant causes the spool 9 to rotate in the belt withdrawing direction β. However, the deceleration sensing mechanism 10 is activated at a large vehicle deceleration generated in the event of an emergency to stop the rotation of the lock gear 20 of the lock actuation control mechanism 12 in the belt withdrawing direction β. Relative rotation is generated between the spool 9 and the lock gear 20 so that the pawl 19 is actuated to engage one of the internal teeth 2a of the frame 2. Accordingly, the rotation of the locking base 18 in the belt withdrawing direction β is stopped. The rotation of the torsion bar 13 in the belt withdrawing direction β is also stopped by the stop of the rotation of the locking base 18.

The spool 9 tries to further rotate in the belt withdrawing direction β relative to the locking base 18. Accordingly, the shearing load acts on the shear pins 24 so that the shear pins 24 start shear deformation. The shear deformation of the shear pins 24 allows the relative rotation of the spool 9 relative to the locking base 18 in the belt withdrawing direction β.

The shearing force on the shear pins 24 pulls on the shear pins in a direction away from the end of the spool. The shear pins 24 are prevented from moving relative to the spool 9 because the external threaded portions 24c of the shear pins 24 engaged with the internal threaded portions 9c of the spool 9. Therefore, the portions of the locking base 18 where the shear pins 24 are installed are prevented from being spaced apart from the spool 9 and thus from being inclined. Accordingly, little bending load acts on the shear pins 24 and substantially only shearing load acts on the shear pins 24.

In addition, since the spool 9 is not in contact with the first torque transmitting portion 22 in the belt withdrawing direction β, the spool 9 idly rotates relative to the first torque transmitting portion 22. That is, no torsional load is applied to the torsion bar 13.

At the start of and in the initial stage of EA action in the seat belt retractor 3, EA action only by the shear deformation of the shear pins 24 is performed. As shown in FIG. 5(a), the EA load during this stage is only applied to the shear pins 24 and the EA load is gradually increased according to the belt withdrawing (belt elongation) amount withdrawn or elongated by the occupant's inertia. While the spool 9 idly rotates relative to the first torque transmitting portion 22, the EA load by the shear pins 24 becomes the maximum EA load F0 and, after that, the EA load by the shear pins 24 is gradually decreased.

Before the shear pins 24 are sheared, the spool 9 idly rotates relative to the first torque transmitting portion 22 by an idle angle θ and comes in contact with the first torque transmitting portion 22 of the torsion bar 13 in the belt withdrawing direction β as shown in FIG. 3(b). By this contact, the idle rotation of the spool 9 relative to the first torque transmitting portion 22 ends.

Torsional load acting on the torsion bar 13 deforms the torsion bar 13 and the spool 9 and the first torque transmitting portion 22 rotate together in the belt withdrawing direction β. Therefore, EA action by torsional deformation of the torsion bar 13 is performed in addition to the EA action by the shear deformation of the shear pins 24 as shown in FIG. 5(a). The EA load during this is a total of the EA load by the shear pins 24 and the EA load by the torsion bar 13 as shown in FIG. 5(a). The idle angle θ of the spool 9 is set such that the idle rotation of the spool 9 ends after the EA load by the shear pins 24 becomes the maximum, thereby effectively reducing the variation in the maximum EA load during the EA action.

As the shear pins 24 are sheared, the EA action by the shear pins 24 ends and the EA action only by the torsion bar 13 is performed as shown in FIG. 5(a). Therefore, the EA load by the shear pins 24 is removed and the energy is absorbed by the torsion bar 13. As the torsional deformation of the torsion bar 13 exceeds a certain amount as shown in FIG. 5(a), the EA load by the torsional deformation of the torsion bar 13 becomes constant. In this manner, in the seat belt retractor 3 of this embodiment, the load applied on the seat belt 4 is limited by the aforementioned respective EA loads to absorb impact applied to the occupant.

According to the seat belt retractor 3 of this embodiment, the shear pins 24 are connected to the spool 9 by screwing, whereby the shear pins 24 are securely fixed to the spool 9. Therefore, even though pulling force is applied to the shear pins 24 in a direction of coming off the spool 9 when the spool 9 rotates relative to the locking base 18, the shear pins 24 are prevented from moving in a direction of coming off the spool 9.

Since the mechanism has simple structure using inexpensive shear pins 24 and the external threaded portions 24c of the shear pins 24 are simply screwed into the internal threaded portions 9c of the spool 9, the seat belt load limiting mechanism can be easily and inexpensively manufactured with slight design change without significant design change of a seat belt load limiting mechanism of a conventional seat belt retractor.

By connecting the shear pins 24 to the spool 9 by screwing, the positions of the shear pins 24 relative to the spool 9 are constant, thereby improving accuracy of positions of the notch grooves 24d, formed in the shear pins 24, relative to the spool 9 when the shear pins 24 are assembled to the spool 9. Accordingly, it is possible to set the shearing load of the shear pins 24 with high accuracy to further secure the load limiting action of the shear pins 24 by the shear deformation.

The load limiting action of the shear pins 24 can be conducted substantially only with the shear deformation, thereby achieving the restraint of the occupant by the seat belt in the event of an emergency with smaller restraining force.

Though the torsional deformation of the torsion bar 13 is set to start after the EA load by the shear pins 24 becomes the maximum EA load in the aforementioned embodiment, the present invention is not limited thereto. For example, the torsional deformation of the torsion bar 13 may be set to start simultaneously with when the EA load by the shear pins 24 becomes the maximum EA load. Alternatively, the torsional deformation of the torsion bar 13 may be set to start after the shear pins 24 are sheared. It is possible whenever the torsional deformation of the torsion bar 13 is set to start simultaneously with or after the EA load by the shear pins 24 becomes the maximum EA load. That is, the start of the torsional deformation of the torsion bar 13 may be set based on the maximum EA load by the shear pins 24.

Though the idle angle θ is set between the first torque transmitting portion 22 of the torsion bar 13 and the spool 9 in the aforementioned embodiment, an idle angle θ may be set between the second torque transmitting portion 23 of the torsion bar 13 and the locking base 18, instead of between the first torque transmitting portion 22 and the spool 9.

Though the shear pins 24 are employed as shearing members in the aforementioned embodiment, different shearing members may be employed whenever the shearing members are disposed between the spool 9 and the locking base 18 and can be shear-deformed when the spool 9 rotates relative to the locking base 18.

Though the shear pin 24 is fixed in the axial direction of the spool 9 not to move relative to the spool 9 by screwing the external threaded portion 24c of the shear pin 24 into the internal threaded portion 9c of the spool 9, the present invention is not limited to a threadable fixing method by screwing. For example, the shear pin 24 may be fixed in the axial direction by press fitting into the axial hole of the spool 9.

The seat belt retractor and the seat belt apparatus are suitably used as a seat belt retractor provided with an energy absorbing mechanism comprising a torsion bar and a shearing member, and a seat belt apparatus employing the seat belt retractor. The torsion bar is torsionally deformed and the shearing member is shear-deformed at the time of preventing the seat belt from being withdrawn by inertia of an occupant in the event of an emergency such as a collision when the occupant wears a seat belt, thereby absorbing kinetic energy of the occupant and thus limiting load applied to the seat belt.

The priority application, Japanese Patent Application No. 2007-083784, filed Mar. 28, 2007 including the specification, drawings, claims and abstract, is incorporated herein by reference in its entirety.

It is important to note that the arrangement of the seat belt retractor, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Many modifications are possible without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A seat belt retractor comprising:
    a spool for winding up a seat belt,
    a locking mechanism having a locking member that is prevented from rotating in a belt withdrawing direction in the event of an emergency, and
    a seat belt load limiting mechanism for limiting load applied to the seat belt when the spool rotates relative to the locking member, the load limiting mechanism comprising:
    a torsion bar that rotationally connects the spool and the locking member and is torsionally deformable when the spool rotates relative to the locking member, and
    a shearing member that is disposed to extend both in the spool and the locking member, the shearing member being shear-deformable when the spool rotates relative to the locking member,
    wherein at least a portion of the area of the shearing member positioned in the spool is fixed to the spool in the axial direction.

2. A seat belt retractor as claimed in claim 1, wherein the shearing member is a shear pin, and the portion of the shear pin fixed to the spool is a screwed connection.

3. A seat belt retractor as claimed in claim 2, wherein the shear pin has a notch groove formed therein which is adapted to be sheared.

4. A seat belt apparatus comprising:
    a seat belt for restraining an occupant;
    a tongue slidably supported by the seat belt;
    a buckle fixed to a vehicle floor or a vehicle seat and to which the tongue can be detachably latched; and
    a seat belt retractor including a spool for winding up a seat belt,
    wherein the retractor further includes a locking mechanism having a locking member that is prevented from rotating in a belt withdrawing direction in the event of an emergency, and a torsion bar that rotationally connects the spool and the locking member and is torsionally deformable when the spool rotates relative to the locking member, and a shearing member that is disposed to extend both in the spool and the locking member, the shearing member being shear-deformable when the spool rotates relative to the locking member, wherein at least a portion of the area of the shearing member positioned in the spool is fixed to the spool in the axial direction;
    wherein the retractor is actuated in an emergency to prevent the withdrawal of said seat belt.

5. A seat belt apparatus as claimed in claim 4, wherein the shearing member is a shear pin, and the portion of the shear pin fixed to the spool is a screwed connection.

6. A seat belt apparatus as claimed in claim 5, wherein the shear pin has a notch groove formed therein which is adapted to be sheared.

7. A seat belt retractor comprising:
    a spool for winding up a seat belt and a locking member that is prevented from rotating in a belt withdrawing direction in the event of an emergency, and
    a torsion bar for limiting load applied to the seat belt when the spool rotates relative to the locking member, the torsion bar rotationally connected to the spool and the locking member and is configured to deform when the spool rotates relative to the locking member, and
    a shearing member that is disposed to extend both in the spool and the locking member, the shearing member being shear-deformable when the spool rotates relative to the locking member, wherein at least a portion of the area of the shearing member positioned in the spool is fixed to the spool in the axial direction.

* * * * *